(12) United States Patent
Saegusa

(10) Patent No.: US 7,261,459 B2
(45) Date of Patent: Aug. 28, 2007

(54) LIGHT SOURCE DEVICE AND PROJECTOR

(75) Inventor: Takashi Saegusa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 32 days.

(21) Appl. No.: 11/085,137

(22) Filed: Mar. 22, 2005

(65) Prior Publication Data
US 2005/0231972 A1 Oct. 20, 2005

(30) Foreign Application Priority Data
Mar. 30, 2004 (JP) ............... 2004-100166

(51) Int. Cl.
*H01R 33/00* (2006.01)
(52) U.S. Cl. ............... 362/652; 362/294; 362/346; 362/652
(58) Field of Classification Search ........... 362/346, 362/294, 652, 656
See application file for complete search history.

(56) References Cited

U.S. PATENT DOCUMENTS 3,806,236 A * 4/1974 Downing .................. 353/97
4,636,925 A * 1/1987 Kristofek ................. 362/277
6,398,367 B1 * 6/2002 Watanabe .................. 353/98

FOREIGN PATENT DOCUMENTS

| JP | 05334710 A * | 12/1993 |
| JP | A 08-304739 | 11/1996 |
| JP | A 2003-287812 | 10/2003 |

* cited by examiner

*Primary Examiner*—Renee Luebke
*Assistant Examiner*—Mary Zettl
(74) *Attorney, Agent, or Firm*—Oliff & Berridge, PLC

(57) ABSTRACT

A light source device which can reliably prevent the displacement of its reflector and a projector including the light source device includes a housing. The housing of the light source device includes: a cover member attached to cover a reflecting portion of a reflector from its front side in a light beam launching direction. The housing also includes a housing body to cover the reflector from its rear side in the light beam launching direction. The cover member and reflector are secured by clip-shaped fixing members to pinch and hold the flange portion of the reflector and the abutting face of the cover member abutting against the flange portion. The fixing members are disposed between the slanted face portions of the housing body and the cover member, and pinched and held therebetween.

13 Claims, 13 Drawing Sheets

F I G. 1 1
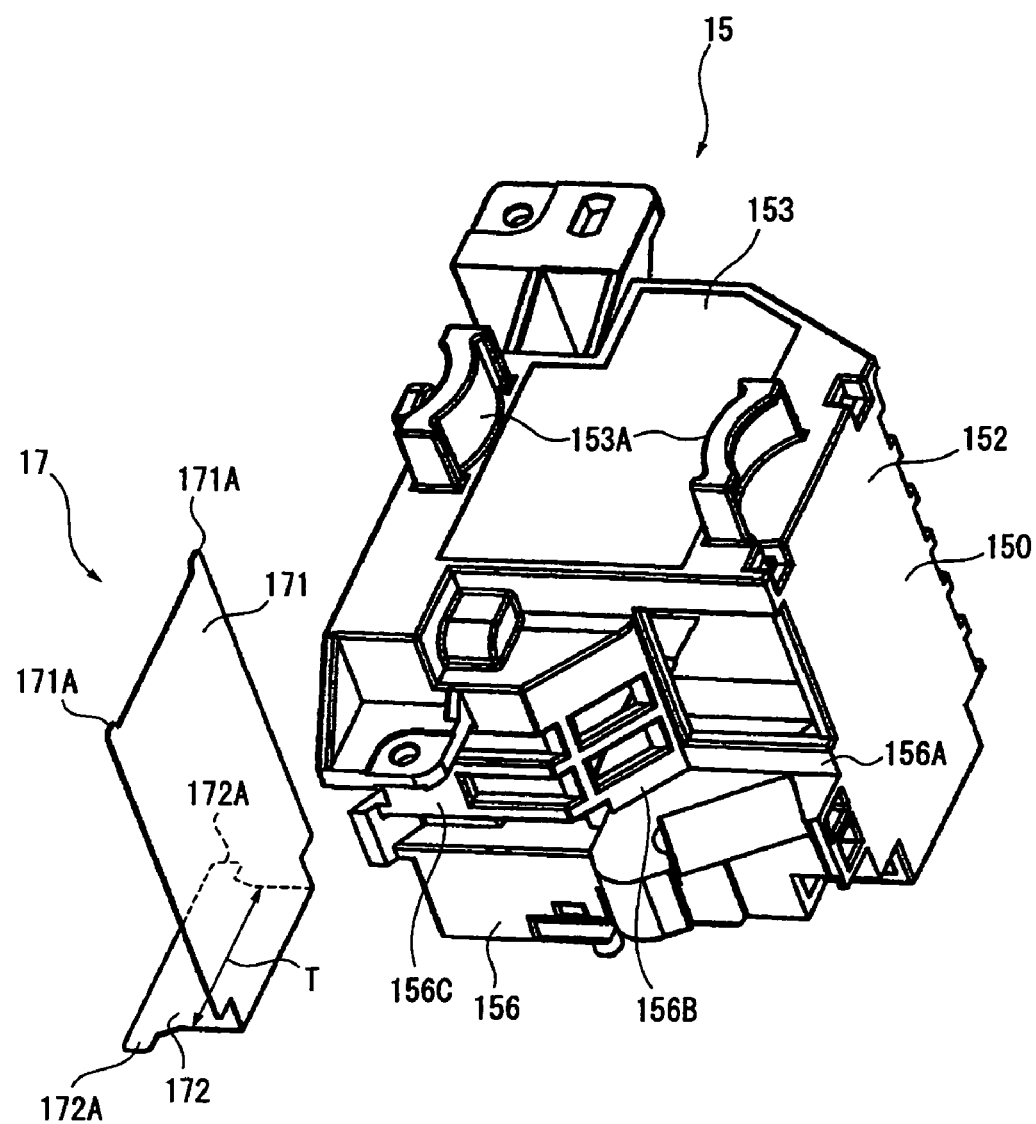

LIGHT SOURCE DEVICE AND PROJECTOR

BACKGROUND

The exemplary embodiments of the present invention relate to a light source device and a projector.

In the related art, a projector can be used for presentations in a meeting, an academic conference, an exposition, etc., for seeing movies at home, and the like. Such a projector includes a light source device, an optical device for modulating a light beam radiated from the light source device according to image data to form an optical image, and a projection optical device for enlarging and projecting the formed optical image onto a projection plane.

The light source device of such a projector includes a light source lamp, a reflector for aligning and launching a light beam from the light source lamp, and a fixed frame (cover member) disposed so as to cover a front side of the reflector, from which the light beam is launched, with an opening for transmission of the light beam formed therein (e.g. see JP-A-2003-287812 (p. 7-10, and FIG. 16)). The reflector and cover member are pinched and held, and secured by clip-like springs.

SUMMARY

However, in a light source device having a structure of the related art, as discussed above, its reflector and cover member are secured by clip-like springs and as such, the springs can be disengaged when the projector is given a strong impact. In this case, the reflector will be displaced, which poses a problem that a light beam from a light source lamp cannot be launched correctly in a predetermined direction.

To address or solve this problem and other problems, the exemplary embodiments provide a light source device which can reliably prevent displacement of the reflector, and a projector including such a light source device.

A light source device of the exemplary embodiments includes: a light source lamp providing a light beam, a reflector having a reflecting portion to align and launch a light beam from the light source lamp, and a housing to accommodate the reflector and light source lamp. The housing defines an opening for a light beam transmission formed therein, a cover member to cover the reflecting portion of the reflector from a front side of the reflector in a light beam launching direction, an opening to accommodate the light source lamp, reflector, and cover member, and a housing body to cover the reflector from a rear side of the reflector in the light beam launching direction, fixing members that secure the reflector to the cover member, and at least a part of each of the fixing members located between the housing body and the cover member.

According to the exemplary embodiments, a part of each of the fixing members to secure the reflector and the cover member is disposed so as to be pinched between the housing body and the cover member. As such, the fixing members can be prevented from falling away even when a strong impact is applied to the light source device. This makes it possible to prevent or discourage the displacement of the reflector with respect to the cover member.

Also, according to the exemplary embodiments, the following is preferable: the reflecting portion of the reflector having a reflecting portion main body to align and launch a light beam from the light source lamp, and a flange portion extending outwardly from a periphery of an opening to launch a light beam of the reflecting portion main body; the fixing members each having a pair of urging portions to at least one of urge, pinch, and hold the flange portion of the reflector and an abutting face of the cover member abutting against the flange portion.

According to the exemplary embodiment, the reflector and the cover member can be secured by just pinching and holding the flange portion of the reflector and the abutting face of the cover member, which abuts against the flange portion, with the pair of urging portions of each fixing member. As such, the reflector can be secured easily. In addition, the reflector and the cover member are urged, pinched, and held by the fixing members, thereby to be secured and as such, in the case where the attachment position of the reflector is adjusted after the reflector and cover member have been secured, releasing the urging force that the urging portions generate allows the fixing members to be removed easily. Therefore, the attachment position of the reflector can be adjusted easily.

Further, according to the exemplary embodiments, the following is preferable: the housing is assembled by inserting the cover member with the reflector secured thereto from a side of the opening of the housing body, a pipe-like duct in communication with a housing space inside the housing to accommodate the reflector and light source lamp is formed.

According to the exemplary embodiment, the duct in communication with the housing space to accommodate the reflector and the light source lamp is formed in the housing. As such, air heated by heat of the light source lamp in the housing space can be exhausted to cool the light source lamp efficiently.

Still further, it is preferable that light-shielding plates are inserted between an outer surface of the reflecting portion of the reflector and the cover member.

According to the exemplary embodiments, the leakage of unwanted light from the housing can be prevented or discouraged by inserting the light-shielding plates between the reflecting portion of the reflector and the cover member. Also, by inserting the light-shielding plates between the reflecting portion of the reflector and the cover member, the cover member can be prevented from or discouraged being affected by heat from the light source lamp.

In addition, according to the exemplary embodiments, the following is preferable: the housing body has an opposing plane portion opposed to the opening to accommodate the cover member, the reflector, and light source lamp, and side-face portions extending from an outer periphery of the opposing plane portion toward the opening; and a light-shielding plate inserted between the opposing plane portion and the reflector.

According to the exemplary embodiments, the leakage of unwanted light from the housing can be prevented or discouraged by inserting the light-shielding plate between the opposing plane portion of the housing body and the reflector. Also, by inserting the light-shielding plate between the opposing plane portion of the housing body and the reflector, the housing body can be prevented or discouraged from being affected by heat from the light source lamp.

Further, according to the exemplary embodiments, the following are preferable: the opposing plane portion has holes formed in the outer periphery, and nail portions formed in the light-shielding plate are inserted in the holes.

According to the exemplary embodiment, inserting the nail portions of the light-shielding plate in the holes formed in the periphery of the opposing plane portion of the housing body makes it possible to reliably secure the light-shielding plate to the housing body.

The following exemplary embodiments are also preferable: the light-shielding plate being shaped into a substantial L form in a side view; and the light-shielding plate having the nail portions formed in one end portion in the direction along the L form, and engaging pieces formed in the other end portion to engage with protrusions formed on the side-face portion of the housing body.

According to the exemplary embodiment, in the other end portion of the light-shielding plate, the engaging pieces for engaging with the protrusions formed in the side-face portion of the housing body are formed. As such, the light-shielding plate can be secured to the housing body reliably.

A projector of the exemplary embodiments includes any one of the light source devices described above, a light modulation device to modulate a light beam launched from the light source device according to an image data, and a projection optical device to enlarge and project the light beam modulated by the light modulation device.

Accordingly, this projector, may include any one of the foregoing light source devices and as such, it is possible to provide the same advantage as the light source device does.

In other words, the fixing members to secure the reflector and the cover member can be prevented or discouraged from falling away, and therefore the displacement of the reflector can be reliably prevented.

BRIEF DESCRIPTION OF THE DRAWINGS

FIG. 11 is a perspective schematic showing the housing body and a light-shielding plate in an exemplary embodiment;

DETAILED DESCRIPTION OF EMBODIMENTS

Exemplary embodiments will be described below with reference to the drawings.

Figure 1:
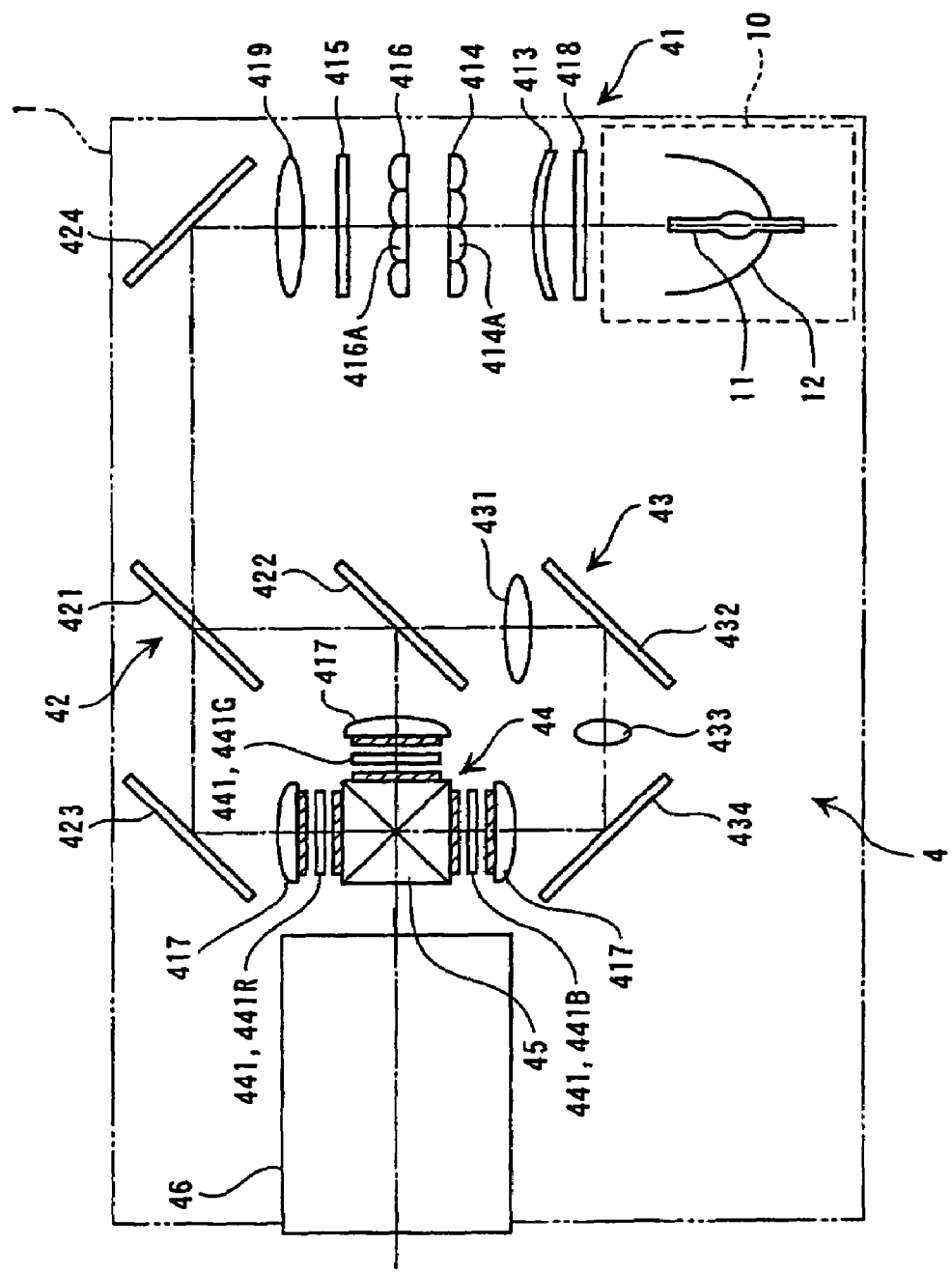
FIG. 1 is a schematic showing an optical system of a projector according to an exemplary embodiment.

FIG. 1 shows an optical unit 4 used in a projector 1 according to an exemplary embodiment.

The optical unit 4 is a unit to optical process a light beam emitted from a light source to form an optical image corresponding to an image data, which includes an integrator-illuminating optical system 41, a color-separator optical system 42, a relay optical system 43, an optical device 44, a cross dichroic prism 45, and a projection lens 46.

The integrator-illuminating optical system 41 is an optical system intended to supply a light beam to image-forming regions of three liquid crystal panels 441 included in the optical device 44 (which are represented for respective color light components as liquid crystal panels 441R, 441G and 441B). The integrator-illuminating optical system 41 includes a light source device 10, a UV filter 418, a collimator lens 413, a first lens array 414, a second lens array 416, a polarizer element 415, a superimposing lens 419 and a reflection mirror 424.

Figure 2:
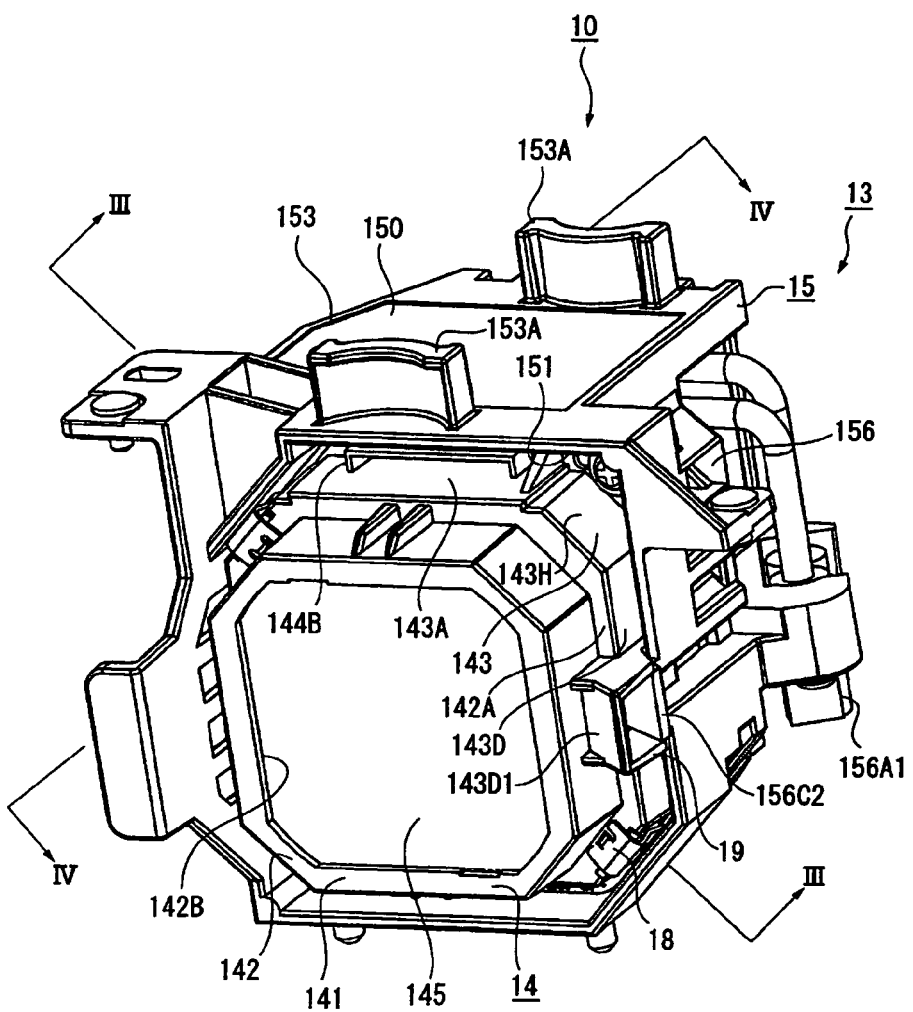
FIG. 2 is a perspective schematic showing a light source device of the projector in an exemplary embodiment.

Of these, the light source device 10 has a light source lamp 11 as a radiation light source to radially emit light beams, a reflector 12 to reflect the radiation light emitted from the light source lamp 11 and a housing 13 (see FIG. 2 and subsequent drawings). As the light source lamp 11, a halogen lamp, metal halide lamp, or high-pressure mercury vapor lamp is often used. As the reflector 12, a parabolic mirror may be used.

The structure of such light source device 10 will be described later in detail.

The first lens array 414 has a configuration such that small lenses 414A, each having a substantially rectangular outline when viewed from a direction of the optical axis, are arrayed in a matrix form. The small lenses 414A split a light beam, which has been emitted from the light source lamp 11 and passed through the UV filter 418 and collimator lens 413, into a plurality of secondary light beams. The shape of the outline of each small lens 414A is determined so as to be substantially similar to the shape of the image-forming regions of the liquid crystal panels 441.

The second lens array 416 has a configuration substantially similar to that of the first lens array 414, small lenses 416A being arrayed in a matrix form. The second lens array 416 has the function of making images formed by the small lenses 414A of the first lens array 414 focus on the liquid crystal panels 441 together with the superimposing lens 419.

The polarizer element 415 is disposed between the second lens array 416 and the superimposing lens 419, and serves to convert light from the second lens array 416 into a kind of polarized light, thereby to increase the efficiency of use of light in the optical device 44.

More specifically, the secondary light beams, which have been converted into a kind of polarized light by the polarizer element 415, are substantially superimposed on the liquid crystal panels 441R, 441G and 441B of the optical device 44 by the superimposing lens 419. The projector 1 (optical device 44) of the exemplary embodiment, which uses liquid crystal panels 441 of a kind of modulating polarized light, only one kind of polarized light can be utilized. As such, substantially one-half the light from the light source lamp 1, which also radiates other kinds of randomly polarized light, cannot be utilized.

Hence, the polarizer element 415 is used to convert all the light emitted from the light source lamp 11 into one kind of polarized light, thereby increasing the efficiency of use of light in the optical device 44. A similar polarizer element 415 has been introduced by, for example, JP-A-8-304739.

The color-separator optical system 42 includes two dichroic mirrors 421, 422, and a reflection mirror 423. The dichroic mirrors 421, 422 separate a plurality of secondary light beams emitted from the integrator-illuminating optical system 41 into three-color lights of red, green, and blue.

The relay optical system 43 includes an incident-side lens 431, a relay lens 433, and reflection mirrors 432, 434. The relay optical system 43 guides the blue color light of the color lights separated by the color-separator optical system 42 to the liquid crystal panels 441B.

Here, the dichroic mirror 421 of the color-separator optical system 42 reflects blue and green color lights of the light beams emitted from the integrator-illuminating optical system 41 and allows the red color light to pass through. The red color light which has penetrated the dichroic mirror 421 is reflected by the reflection mirror 423, passes through the field lens 417, and reaches the liquid crystal panels 441R for red color. A field lens 417 serves to convert the secondary light beams emitted from the second lens array 416 into light beams parallel with their central axes (i.e. main beams). Also, field lenses 417 provided in front of the other liquid crystal panels 441G, 441B serve in the same way.

Of the blue and green color lights reflected by the dichroic mirror 421, the green color light is reflected by the dichroic mirror 422, passes through the field lens 417, and reaches the liquid crystal panels 441G for green color. On the other hand, the blue color light penetrates the dichroic mirror 422, passes through the relay optical system 43, further passes through a field lens 417, and reaches the liquid crystal panels 441B for blue color. The relay optical system 43 is used for blue light because the diffusion of light and the like are prevented or discouraged from reducing the efficiency of use of light owing to the optical path of blue color light longer than those of the other colors. That is, it is intended to transmit the secondary light beams which have come into the incident-side lens 431 to the field lens 417 as they are.

The optical device 44 includes three light modulation devices, i.e. the liquid crystal panels 441R, 441G, 441B; these use, for example, poly-silicon TFTs as switching elements. The respective color lights separated by the color-separator optical system 42 are modulated by the three liquid crystal panels 441R, 441G, 441B according to image data to form optical images.

The cross dichroic prism 45 combines images separately modulated for respective colors, which have been emitted from the three liquid crystal panels 441R, 441G, 441B, to form a color image.

In the prism 45, a dielectric multi-layer film for reflecting red color light and a dielectric multi-layers film for reflecting blue color light are formed along interfaces of four right-angle prisms in a substantial X form. The three color lights are combined by the dielectric multi-layers films. The color image combined by the prism 45 is emitted from the projection lens 46 and enlarged and projected onto the a screen.

Structure of Light Source Device

Figure 3:
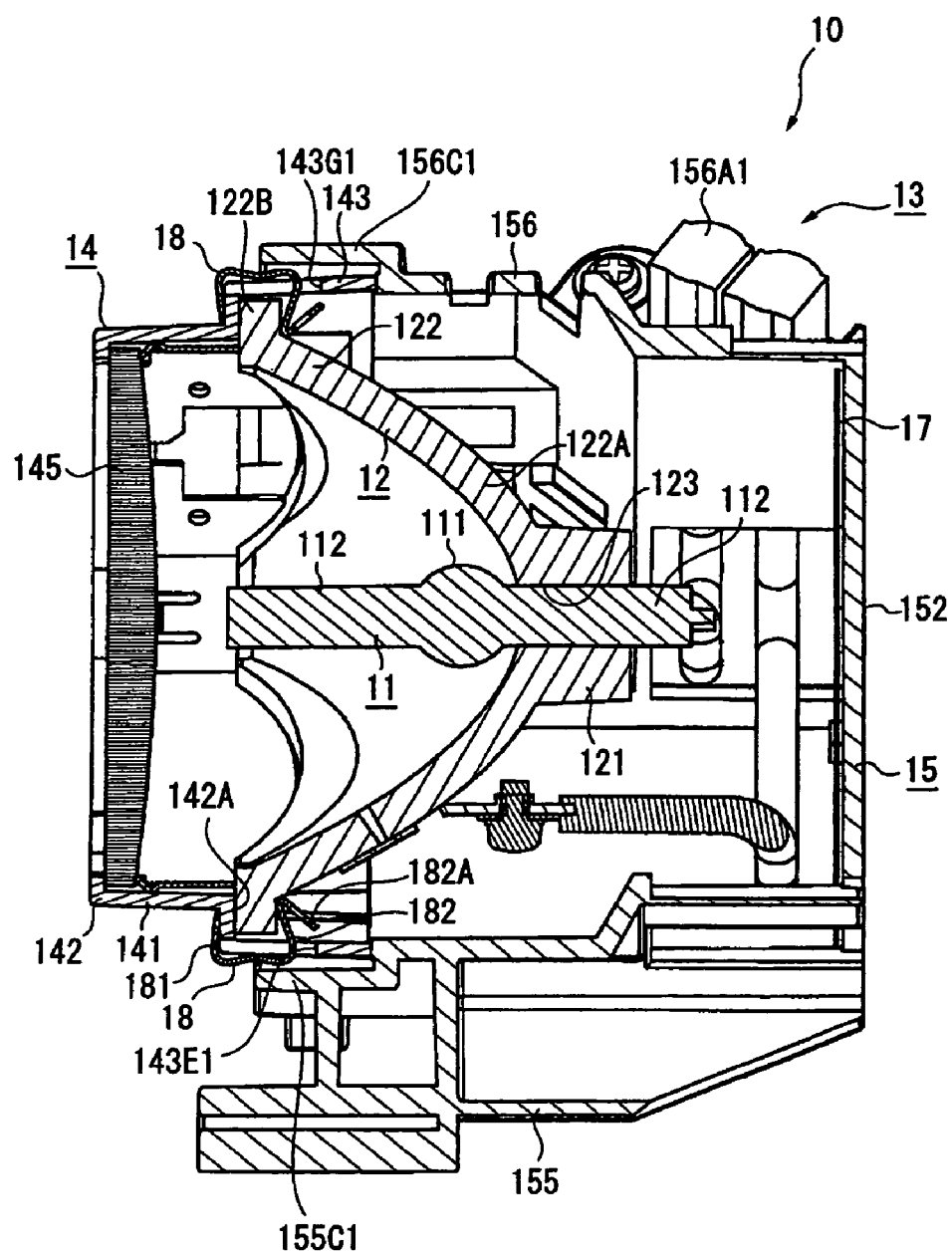
FIG. 3 is a sectional schematic of the light source device of FIG. 2 in an exemplary embodiment.
Figure 4:
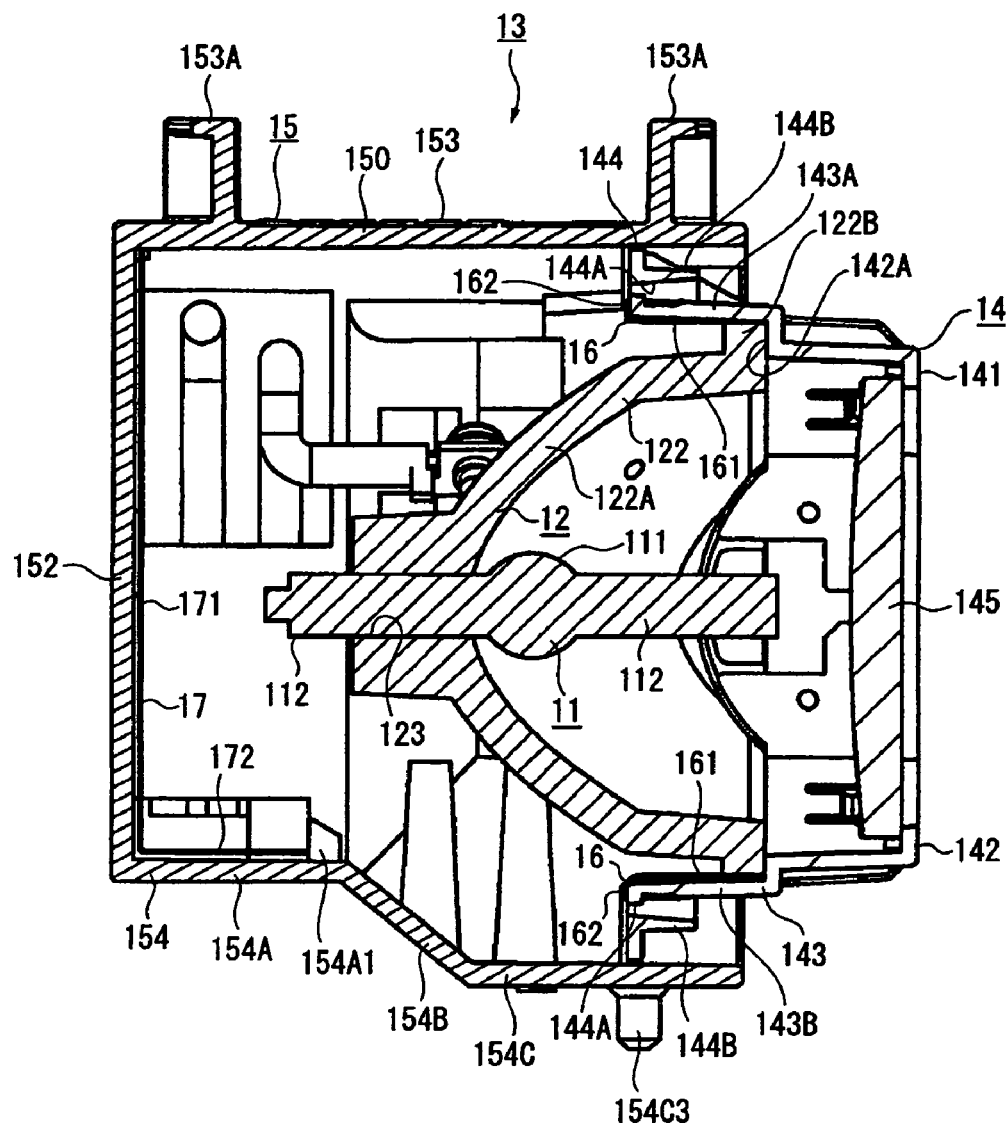
FIG. 4 is a sectional schematic of the light source device of FIG. 2 in an exemplary embodiment.

The above-described light source device 10 is illustrated in FIGS. 2-4. Herein, FIG. 2 is a perspective view of the light source device 10; FIG. 3 is a sectional view taken along the direction of III-III in FIG. 2; and FIG. 4 is a sectional view in the direction of IV-IV in FIG. 2.

The light source device 10 has the light source lamp 11, the reflector 12 to align and launch a light beam launched from the light source lamp 11, and a housing 13 to accommodate the light source lamp 11 and the reflector 12.

The light source lamp 11 includes a quartz glass tube with a central portion of the tube bulging spherically; the central portion making a light-emitting portion 111 and portions extending on the both sides of the light-emitting portion 111 making sealing portions 112.

Sealed inside the light-emitting portion 111, there are a pair of electrodes (not shown) made of tungsten and spaced apart by a predetermined distance, mercury, an inert gas, a small amount of a halogen.

In the sealing portions 112 extending on both sides of the light-emitting portion 111, metal foils made of molybdenum (not shown) electrically connected with the electrodes in the light-emitting portion 111 are inserted, respectively. The sealing portions 112 are sealed with a glass material or the like. Lead wires (not shown) as extension lines for the electrodes are connected with the metal foils. The lead wires extend to the outside of the light source lamp 11. When a voltage is applied between the lead wires, a potential difference is developed between the electrodes through the metal foils, thereby causing discharge therebetween to force the light-emitting portion 111 to emit light.

The reflector 12 is an integrally-molded component made of a glass and includes: a neck portion 121 through which the sealing portion 112 on the side of the base end of the light source lamp 11 is forced to penetrate; and a reflecting portion 122 having an ellipsoid reflecting surface expanding from and about the neck portion 121.

The neck portion 121 has a receiving hole 123 formed in its center; the sealing portion 112 is disposed in the center of the receiving hole 123.

The reflecting portion 122 has: a cup-shaped (substantially-conical) reflecting portion main body 122A made by forming a metal thin film on an ellipsoid glass surface through deposition; and a flange portion 122B extending outwardly from the periphery of an opening of the reflecting portion main body 122A to launch a light beam.

The light source lamp 11 disposed inside the reflecting portion 122 of the reflector 12, is so disposed that the center of light emission between the electrodes 11A in the light-emitting portion 111 is located in the vicinity of the place of the first focal point of the ellipsoid of the reflecting surface of the reflecting portion 122.

The housing 13 includes a cover member 14 attached so as to cover the reflecting portion 122 of the reflector 12 from its front side in the light beam launching direction. The housing 13 further includes a housing body 15 for covering the reflector 12 from its rear side in the light beam launching direction. The housing 13 is made from e.g. a synthetic resin.

Figure 5:
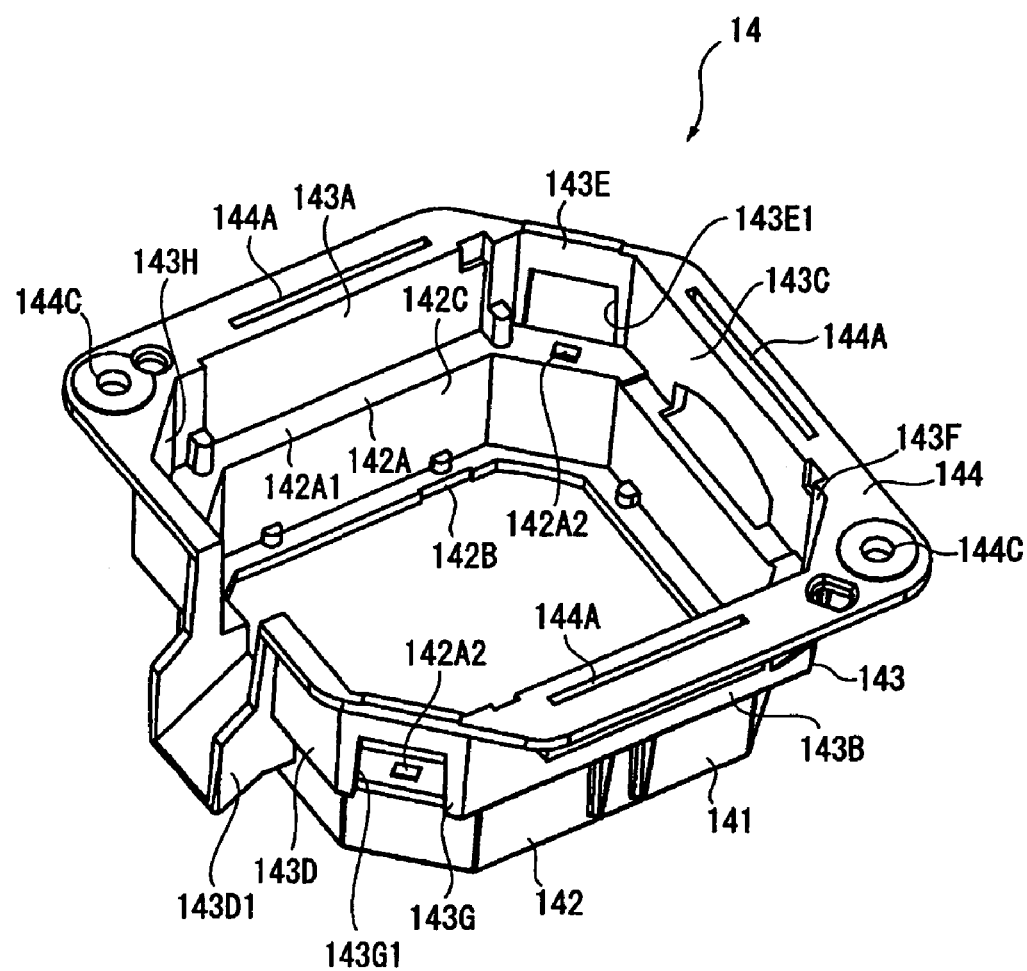
FIG. 5 is a perspective schematic showing a cover member of a housing of the light source device in an exemplary embodiment.
Figure 6:
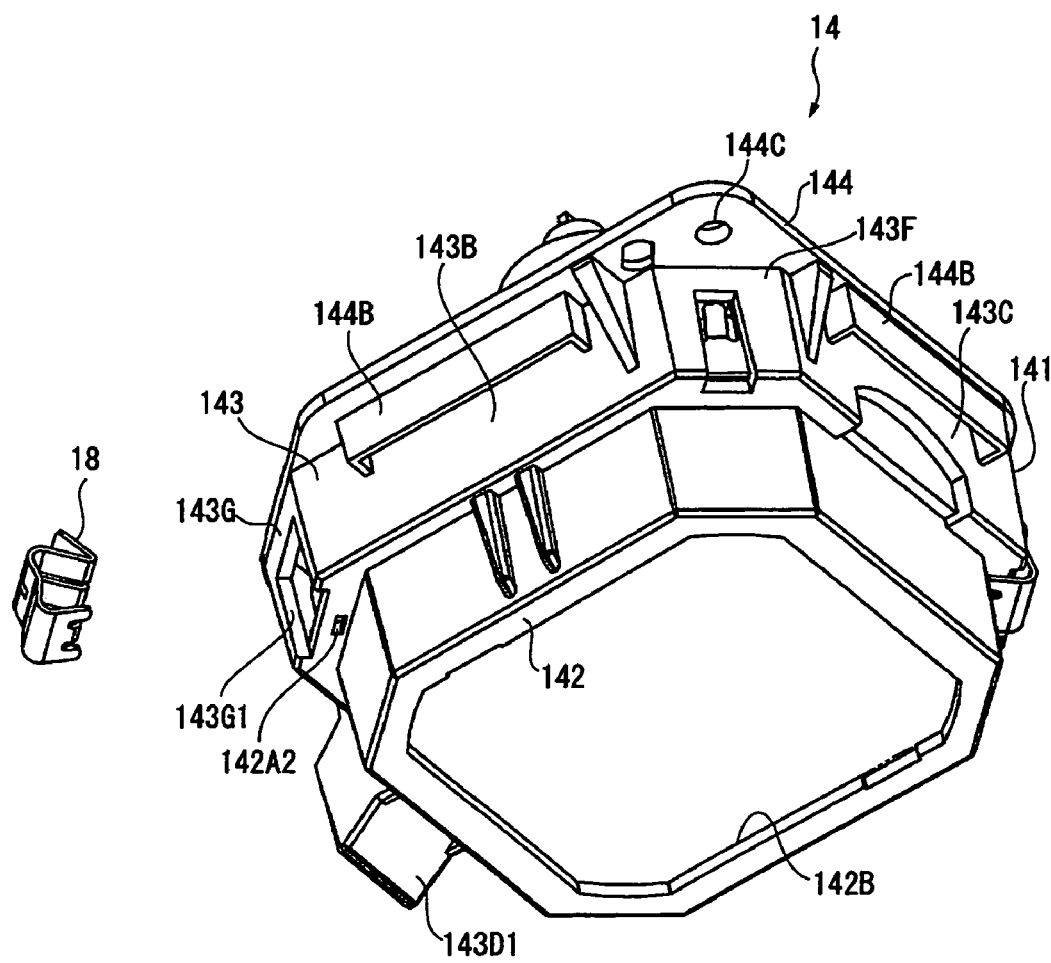
FIG. 6 is a perspective schematic of the cover member taken from a direction different from that in FIG. 5 in an exemplary embodiment.
Figure 7:
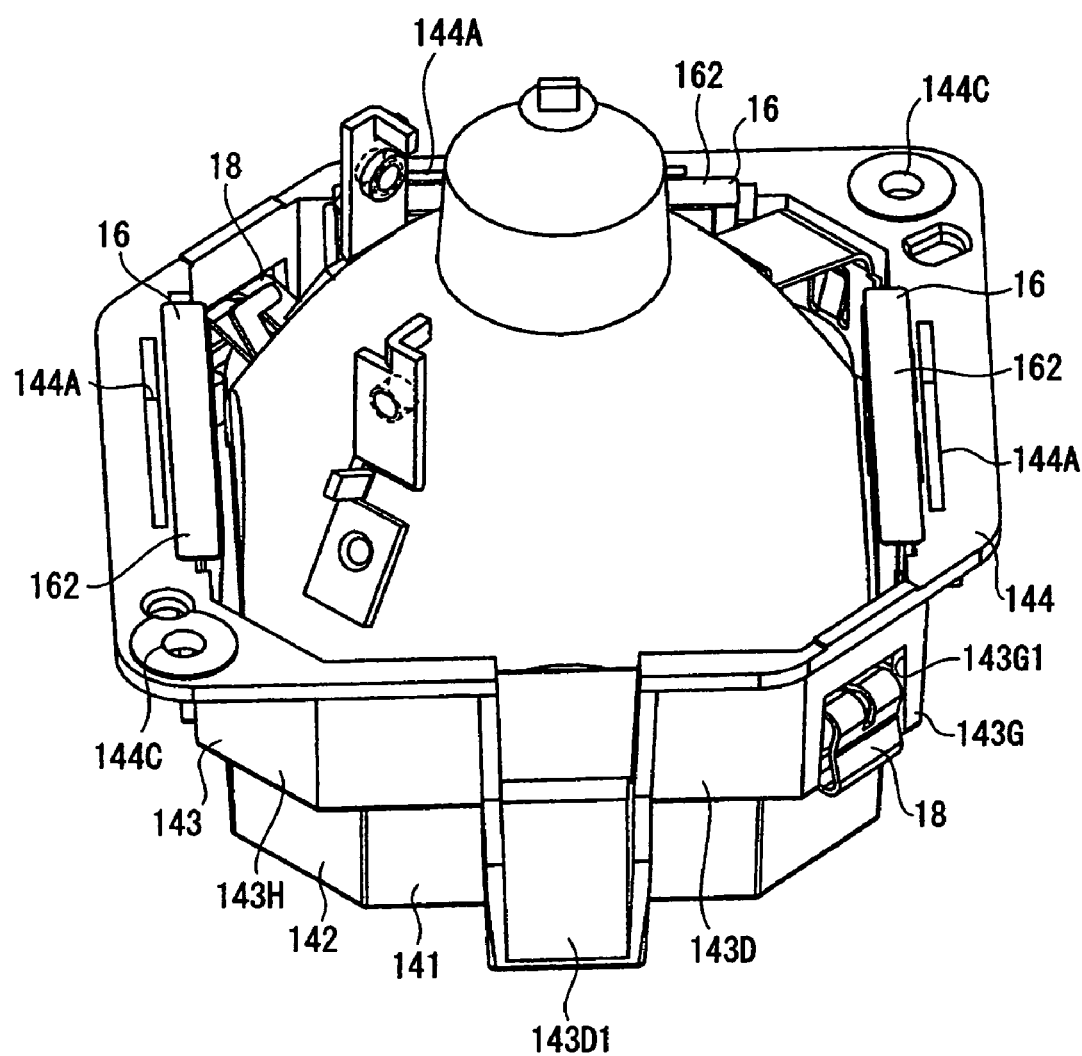
FIG. 7 is a perspective schematic of the cover member taken from a direction different from those in FIGS. 4 and 5 in an exemplary embodiment.

The cover member 14 has a cover member main body 141 to cover the reflecting portion 122 of the reflector 12 from its front side in the light beam launching direction, and a flange portion 144 provided on the cover member main body 141, as shown in FIGS. 5-7.

The cover member main body 141 has a first body portion 142 of a substantially-octagonal frame form, and a second body portion 143 integrally formed with the first body portion 142 and shaped into a substantially-octagonal frame form larger in diameter than the first body portion 142.

The first body portion 142 has the form of a frame, in which a pair of faces thereof opposite to the reflecting surface of the reflecting portion 122 of the reflector 12 opens. The openings 142B, 142C make apertures to launch a light beam reflected off the reflector 12. The diameter of the first body portion 142 is smaller than that of the reflecting portion 122 of the reflector 12. Of the openings 142B, 142C of the first body portion 142, on the periphery of the opening 142C on the side nearer to the second body portion 143, is formed a flange portion 142A broadening outwardly. The inner surface of the flange portion 142A makes an abutting face 142A1 for abutting against the flange portion 122B of the reflecting portion 122 of the reflector 12. Forcing the reflector 12 to abut against the abutting face 142A1 can determine the position of the reflector 12.

In addition, of the openings 142B, 142C of the first body portion 142, to the opening 142B on the opposite side with respect to the second body portion 143 is attached an explosion-proof glass 145 so as to cover the opening 142B. The explosion-proof glass 145 is inserted from inside the first body portion 142 to cover the opening.

The second body portion 143 is upright provided on the flange portion 142A of the first body portion 142, and has the form of a frame larger than the reflecting portion 122 of the reflector 12 in diameter. The second body portion 143 has a pair of side-face portions 143A, 143B (i.e. upside and downside faces in FIGS. 2 and 4) disposed substantially in parallel so as to receive the reflector 12 from the upside and downside of the reflector. The second body portion 143 further has a pair of side-face portions 143C, 143D disposed substantially in parallel with laterally with respect to the reflector 12 (the left and right side faces in FIG. 2); and four slanted face portions 143E, 143F, 143G, 143H for joining between the side-face portions 143A, 143B and the side-face portions 143C, 143D. Of the slanted face portions 143E, 143F, 143G, 143H, in one pair of the opposed slanted face portions 143E, 143G, are formed substantially rectangle-shaped holes 143E1, 143G1. Fixing members 18 are inserted in the holes 143E1, 143G1, which are to be described later.

In portions in the abutting face 142A1 of the flange portion 142A of the first body portion 142, which are adjacent to the slanted face portions 143E, 143G having the holes 143E1, 143G1 formed therein, there are respectively formed holes 142A2 pierced from the abutting face 142A1 of the flange portion 142A to the downside surface with respect to the abutting face 142A1.

Further, one of the side-face portions 143C, 143D, the side-face portion 143D is notched, and has a concave gutter portion 143D1 extending outwardly from the notch formed therein. The gutter portion 143D1 is included by a duct 19 to be described later in the condition where one of four faces thereof along the direction for exhausting cooled air is opened.

The flange portion 144 extends outwardly from the opening of the second body portion 143 on the side opposite from the first body portion 142 of the cover member main body 141. Slits 144A are formed in three side portions of the flange portion 144, which extend outwardly from the side-face portions 143A, 143B, and the side-face portion 143C. Each of the slits 144A extend along a longitudinal direction of the respective side portion and are pierced from the upside surface of the side portion (i.e. the face on the side opposite from the housing body 15) to the downside surface (i.e. the face on the side nearer to the housing body 15). The slits 144A communicate with a housing space inside the housing 13 to accommodate the light source lamp 11 and the reflector 12, when the cover member 14 and the housing body 15 are combined into the housing 13.

On the surface side of the flange portion 144, there are attached fence members 144B, each shaped into a substantial horseshoe form in side view for surrounding the slit 144A.

Further, in the corner portions located on a diagonal line of the flange portion 144, there are formed bores 144C pierced from upside surface of the flange portion 144 to downside surface. The bores 144C are holes into which screws are inserted when the cover member 14 is secured to the housing body 15.

Figure 8:
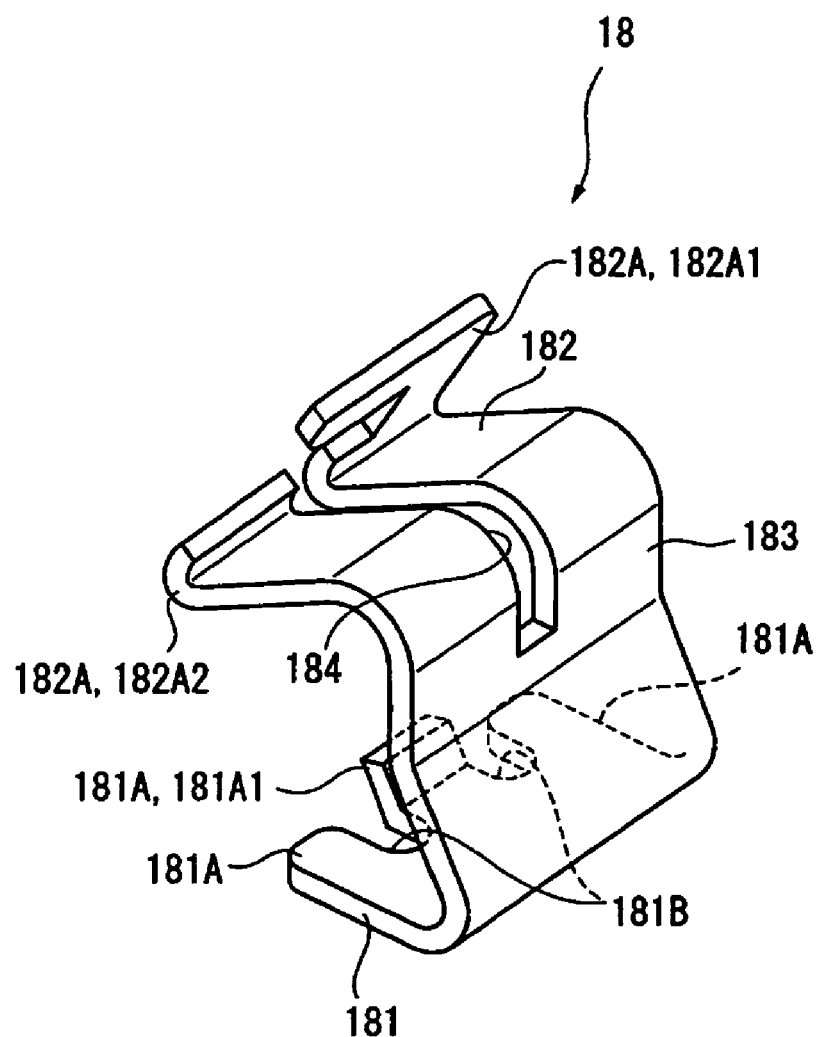
FIG. 8 is a perspective schematic showing a fixing member for securing the cover member and a reflector of the light source device in an exemplary embodiment.
Figure 9:
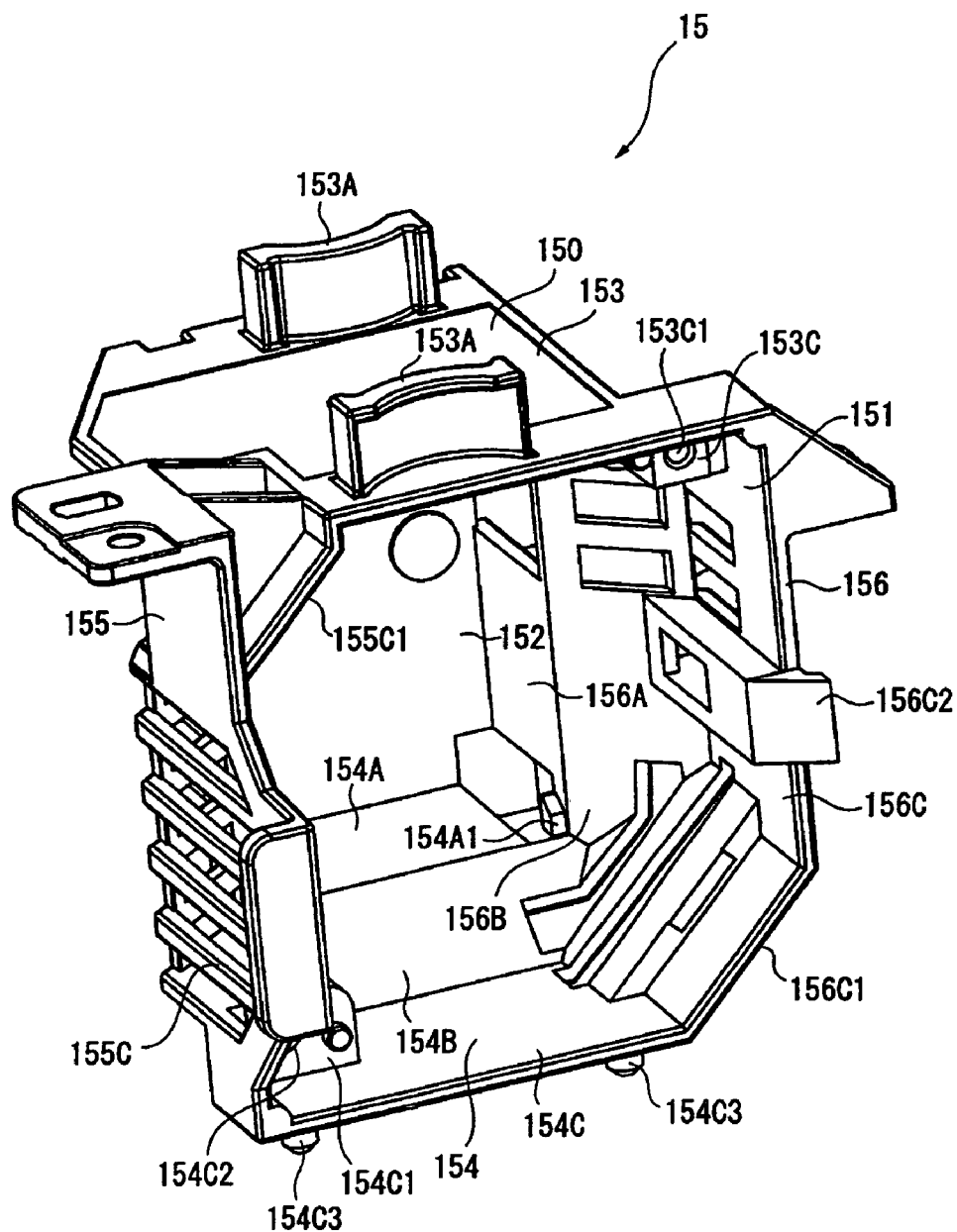
FIG. 9 is a perspective schematic showing a housing body of the housing of the light source device in an exemplary embodiment.

The cover member 14 and the reflector 12 are secured with the fixing members 18. The fixing members 18 may be clip-like urging members, each of which has a pair of opposed urging portions 181, 182 to urge the flange portion 122B of the reflector 12 and the surrounding areas of the holes 143E1, 143G1 of the cover member 14 to pinch and hold the reflector 12 and the cover member 14. An interconnecting portion 183 to join together the urging portions 181, 182, is shown in FIG. 8. Of the paired urging portions 181, the urging portion 181 for holding on the side of the cover member 14 has two notches 181B formed in its leading end and therefore the leading end thereof is divided into three sub-portions 181A. Of the three sub-portions 181A, the central sub-portion 181A1 is bent toward the other urging portion 182. The central sub-portion 181A1 is inserted in the hole 142A2 formed in the flange portion 142A of the first body portion 142 of the cover member 14 when the cover member 14 and the reflector 12 are pinched and held.

The other urging portion 182 of the paired urging portions 181, 182 has a leading end outwardly bent back toward the interconnecting portion 183. Also, a notch 184 is formed across the other urging portion 182 to the inside of the interconnecting portion 183. Therefore, the notch 184 splits the other urging portion 182 into two sub-portions 182A.

One of the two sub-portions 182A, i.e. sub-portions 182A1, extends longer than the other sub-portions 182A2 does, and has a leading end portion bent toward the other sub-portions 182A2.

With the fixing member 18, as shown in FIG. 3, the central sub-portion 181A1 of one urging portion 181 of the paired urging portions 181, 182, is inserted in the hole 141A2 formed in the flange portion 142A of the cover member 14, while the other urging portion 182 is inserted in the corresponding one of the holes 143E1, 143G1 formed in the slanted face portions 143E, 143G of the cover member 14 with the bent-back portion of the leading end of the other urging portion 182 engaged with the flange portion 122B of the reflector 12. Thus, the flange portion 122B of the reflector 12 and the abutting face 142A1 of the cover member 14 abutting against the flange portion 122B are pinched and held and therefore secured by the fixing members 18.

Between the cover member 14 and the reflector 12 secured by the fixing members 18 as described above, there are inserted light-shielding plates 16, as shown in FIGS. 4 and 7. The number of the light-shielding plates 16 used is plural. For example, three light-shielding plates 16 are used in this exemplary embodiment, which are inserted between the side-face portions 143A, 143B, 143C of the second body portion 143 of the cover member 14 and the reflector 12 respectively.

The light-shielding plates 16 are of a substantial L form in side view, and each have a first part 161 shaped into a rectangular form in a plane view and inserted between the reflecting portion 122 of the reflector 12 and the second body portion 143 of the cover member 14. The light-shielding plates further have a locking part 162 shaped into a rectangular form in plane view, and are provided orthogonal to the first part 161, which is to be engaged with and locked to the flange portion 144 of the cover member 14. The locking part 162 has dimensions such that it never closes the slit 144A formed in the flange portion 144 when engaged with and locked to the flange portion 144.

Since the light-shielding plates 16 each have a locking part 162 to be engaged with and locked to the flange portion 144 of the cover member 14, the light-shielding plates 16 can be engaged with and locked to the cover member 14 to reliably secure the light-shielding plates 16 to the cover member 14.

While the form of the light-shielding plates 16 is the substantial L form in side view in this exemplary embodiment, the light-shielding plates 16 are not limited to this form, and may be, for example, a substantial T form in side view. In addition, the light-shielding plates 16 do not have to have the locking part 162 to be engaged with and locked to the flange portion 144 of the cover member 14.

Now, the housing body 15 will be described with reference to FIGS. 2-4, and FIGS. 9-13.

The housing body 15 is intended to accommodate the reflector 12, the light source lamp 11, and a part of the cover member 14. The housing body has an opening 151 for accommodating the reflector 12, the light source lamp 11, and a part of the cover member 14. The housing body 15 further has an opposing plane portion 152 shaped into a substantial rectangular form in plane view and opposed to the opening 151, and a side-face portion 150 upright provided on the periphery of the opposing plane portion 152. The side-face portion 150 has a form such that it spreads out from the opposing plane portion 152 toward the opening 151. When the housing body 15 and the cover member 14 are combined, the second body portion 143 of the cover member 14 is to be covered by the side-face portion 150. The first body portion 142 of the cover member 14 is to be brought into a condition such that it protrudes from the opening 151 of the housing body 15.

The side-face portion 150 has a first side-face portion 153 (a face in an upper side in FIG. 2) for covering the upside of the reflector 12; a second side-face portion 154 (a face in a lower side in FIG. 2) for covering the downside; and a third side-face portion 155 for covering the side of the reflector 12, and a fourth side-face portion 156 (right and left faces in FIG. 2).

The first side-face portion 153 is provided substantially orthogonal to the opposing plane portion 152, and composed of a substantially flat plate material. The first side-face portion 153 has a pair of protrusions 153A formed on its outer surface. Also, a fixing portion 153C for screwing the cover member 14 is formed athwart the boundary of the inner surfaces of the first side-face portion 153 and fourth side-face portion 156, which is to be described later. The fixing portion 153C is formed to be dislocated inwardly from one of the edges defining the opening 151 of the first side-face portion 153 by a predetermined dimension. A threaded hole 153C1 is formed in the fixing portion 153C to allow a screw to mate with the fixing portion.

Figure 10:
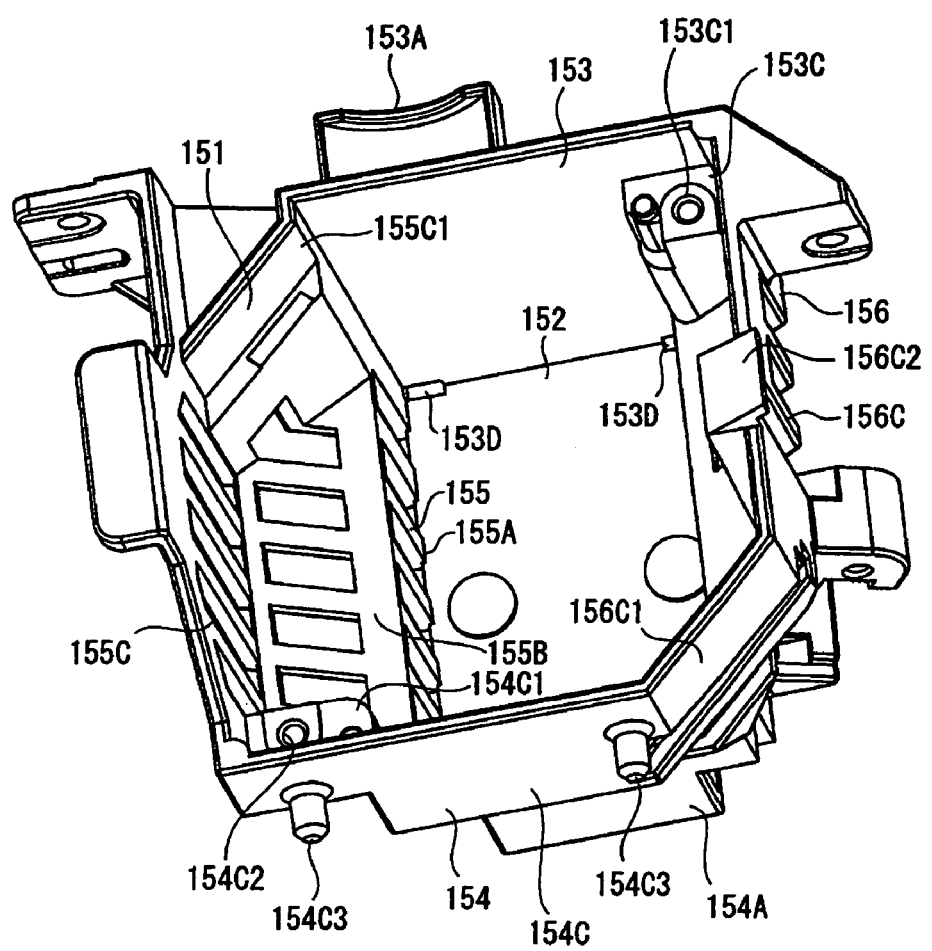
FIG. 10 is a perspective schematic of the housing body taken from a direction different from that in FIG. 9 in an exemplary embodiment.

In a boundary portion of the first side-face portion 153 with respect to the opposing plane portion 152, there is formed a pair of holes 153D (see FIG. 10). The holes 153D are each in a depression form produced by notching the inner surface of the first side-face portion 153 and are respectively formed in corner portions in the boundary portion of the first side-face portion 153 with respect to the opposing plane portion 152.

The second side-face portion 154 includes: a first extending portion 154A extending from a side of the opposing plane portion 152 and substantially orthogonal to the opposing plane portion 152; a second extending portion 154B extending from the first extending portion 154A toward the outside of the housing body 15 at a slant; and a third extending portion 154C extending from the second extending portion 154B substantially orthogonal to the opposing plane portion 152.

A pair of protrusions 154A1 is formed in a boundary line portion of the inner surface of the first extending portion 154A with respect to the second extending portion 154B. The paired protrusions 154A1 are formed in corner portions in an end portion of the first extending portion 154A near the boundary line.

Also, a fixing portion 154C1 to screw the cover member 14 is formed athwart the boundary of the inner surfaces of the third extending portion 154C of the second side-face portion 154 and a third extending portion 155C of the third side-face portion 155, which is to be described later. In the fixing portion 154C1 is formed a threaded hole 154C2 for allowing a screw to mate with the fixing portion. Incidentally, the fixing portion 154C1 is arranged diagonally with respect to the fixing portion 153C formed on the first side-face portion 153.

Further, on the outer surface of the third extending portion 154C of the second side-face portion 154 is formed a pair of protruded leg portions 154C3. The leg portions 154C3 are formed in the vicinities of one of edges of the third extending portion 154C defining the opening 151.

The third side-face portion 155 includes: a first extending portion 155A extending from a side of the opposing plane portion 152 substantially orthogonal to the opposing plane portion 152; a second extending portion 155B extending from the first extending portion 155A toward the outside of the housing body 15 at a slant; and a third extending portion 155C extending from the second extending portion 155B substantially orthogonal to the opposing plane portion 152. Ribs are formed in the first extending portion 155A, second extending portion 155B and third extending portion 155C of the third side-face portion 155.

A slanted face portion 155C1 extending toward the first side-face portion 153 is formed in an end portion nearer to the first side-face portion 153 in the inner surface of third extending portion 155C.

The fourth side-face portion 156 includes: a first extending portion 156A extending from a side of the opposing plane portion 152 substantially orthogonal to the opposing plane portion 152; a second extending portion 156B extending from the first extending portion 156A toward the outside of the housing body 15 at a slant; and a third extending portion 156C extending from the second extending portion 156B substantially orthogonal to the opposing plane portion 152.

On the outer surface of the first extending portion 156A is attached a connector 156A1 to be connected with lead wires of the light source lamp 11.

Further, ribs are formed in the second extending portion 156B and the third extending portion 156C.

Also, an end portion in the third extending portion 156C nearer to the second side-face portion 154 is bent toward the second side-face portion 154 and therefore the end portion makes a slanted face portion 156C1.

In addition, on the inner surface of the third extending portion 156C is formed a lid portion 156C2 for covering the opening of the concave gutter portion 143D1 of the cover member 14. The lid portion 156C2 is formed so as to protrude from the inner surface of the third extending portion 156C outwardly of the housing body 15.

Between such housing body 15 and the reflector 12 is inserted a light-shielding plate 17, as shown in FIGS. 4 and 11-13.

The light-shielding plate 17 is of a substantial L form in side view, and has: a first plane portion 171 disposed along the opposing plane portion 152 of the housing body 15; and a second plane portion 172 provided substantially orthogonal to the first plane portion 171.

The first plane portion 171 has a shape substantially identical with the opposing plane portion 152 of the housing body 15 in size, and it covers the inner surface of the opposing plane portion 152 when the light-shielding plate 17 is inserted between the housing body 15 and the reflector 12.

The first plane portion 171 is a plate-like metal piece shaped into a rectangle form in plane view, and has a pair of projecting piece-like nail portions 171A formed in an end portion thereof opposite from the end portion nearer to the second plane portion 172 (one end portion in a direction along the L form of the light-shielding plate 17). The nail portions 171A are respectively formed in both ends of the end portion, and protrude along a longitudinal direction of the first plane portion 171. The nail portions 171A are inserted into the holes 153D formed in the first side-face portion 153 of the housing body 15 when the light-shielding plate 17 is inserted between the housing body 15 and the reflector 12.

The second plane portion 172 covers the first extending portion 154A of the second side-face portion 154 of the housing body 15 when the light-shielding plate 17 is inserted between the housing body 15 and the reflector 12.

The second plane portion 172 is a plate-like metal piece like the first plane portion 171. A pair of engaging pieces 172A are formed in an end portion of the second plane portion 172 opposite from the first plane portion 171 (the other end portion in a direction along the L form of the light-shielding plate 17). The engaging pieces 172A extend in a direction orthogonal to the longitudinal direction of the light-shielding plate 17. In other words, the engaging pieces 172A extend respectively from a pair of sides orthogonal to the boundary line of the second plane portion 172 with respect to the first plane portion 171 outwardly.

The engaging pieces 172A of the second plane portion 172 are engaged with the protrusions 154A1 formed in the second side-face portion 154 of the housing body 15 when the light-shielding plate 17 is inserted between the housing body 15 and the reflector 12. The size T of the width of a portion where the engaging pieces 172A of the second plane portion 172 are not formed is smaller than the size of the width between the protrusions 154A1 formed in the second side-face portion 154 of the housing body 15.

The light source device 10 as described above is assembled as follows.

First, the light source lamp 11 is secured to the reflector 12. Specifically, one sealing portion 112 of the light source lamp 11 is inserted in the receiving hole 123 in the neck portion 121 of the reflector 12 and fixed thereto with an adhesive or the like.

Second, the reflector 12 with the light source lamp 11 secured thereto is attached to the cover member 14 of the housing 13.

To begin with, the explosion-proof glass 145 is mounted in the opening of the first body portion 142 of the cover member 14 previously.

Further, the reflector 12 is inserted from the side of the second body portion 143 of the cover member 14. In this step, the reflector 12 is inserted so that the opening of the reflecting portion 122 of the reflector 12 is opposed to the explosion-proof glass 145 mounted in the opening of the first body portion 142.

Then, the flange portion 122B of the reflector 12 is forced to abut against the abutting face 142A1 of the first body portion 142 to perform positioning of the reflector 12.

After that, the reflector 12 is secured to the cover member 14 by the fixing members 18.

The central sub-portions 181A1 of one urging portions 181 of fixing members 18 are inserted into the holes 142A2 of the cover member 14, while the other urging portions 182 are inserted into holes 143E1, 143G1 formed in the cover member 14, followed by engaging the bent-back portions located in leading ends of the other urging portions 182 with the flange portion 122B of the reflector 12. Thus, the flange portion 122B of the reflector 12 and the abutting face 142A1 of the cover member 14, which abuts against the flange portion 122B, are urged, and pinched and held by the fixing members 18 to be secured.

Next, the light-shielding plates 16 are inserted between the reflector 12 and the cover member 14.

The first part 161 of one of the light-shielding plates 16 is inserted between the outer surface of the reflecting portion 122 of the reflector 12 and the side-face portion 143A of the second body portion 143 of the cover member 14 to force the locking part 162 to engage with and lock to the flange portion 144.

In addition, the first part 161 of another light-shielding plate 16 is inserted between the outer surface of the reflecting portion 122 of the reflector 12 and the side-face portion 143B of the second body portion 143 of the cover member 14 to force the locking part 162 to engage with and lock to the flange portion 144. Furthermore, the first part 161 of another light-shielding plates 16 is inserted between the outer surface of the reflecting portion 122 of the reflector 12 and the side-face portion 143C of the second body portion 143 of the cover member 14 to force the locking part 162 to engage with and lock to the flange portion 144.

Inserting the light-shielding plates 16 between the outer surface of the reflecting portion 122 of the reflector 12 and the second body portion 143 of the cover member 14 like this makes it possible to prevent or discourage the leakage of unwanted light from the housing 13. In this embodiment, three light-shielding plates 16 are used and inserted between the outer surface of the reflecting portion 122 of the reflector 12 and the second body portion 143 of the cover member 14 and as such, the leakage of unwanted light from the housing 13 can be reliably prevented or discouraged.

In addition, inserting the light-shielding plates 16 between the reflecting portion 122 of the reflector 12 and the second body portion 143 of the cover member 14 makes it possible to prevent or discourage the cover member 14 from deterioration by heat from the light source lamp 11.

Subsequently, the light-shielding plate 17 is attached to the housing body 15.

Figure 12:
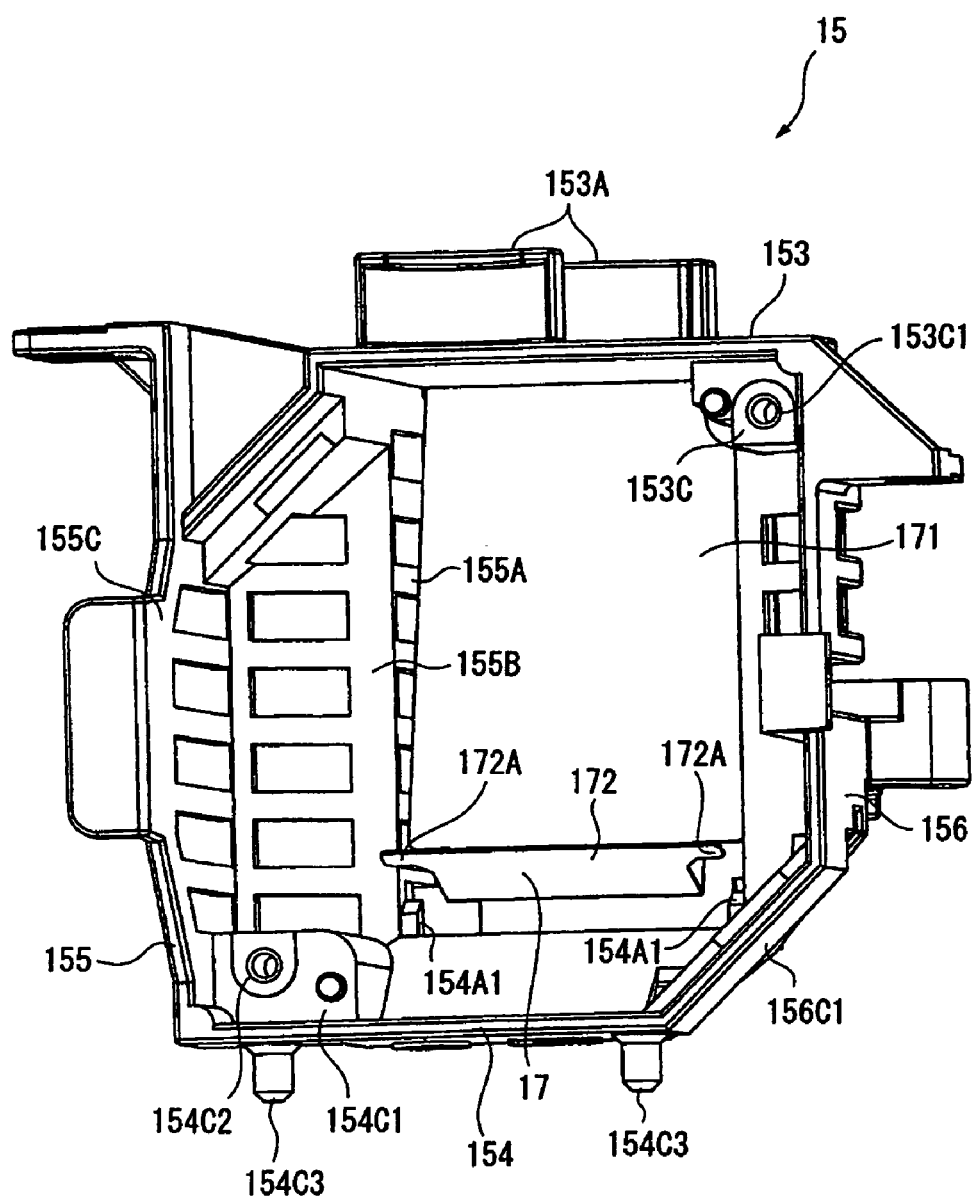
FIG. 12 is a perspective schematic showing a condition where the light-shielding plate is inserted into the housing body in an exemplary embodiment.
Figure 13:
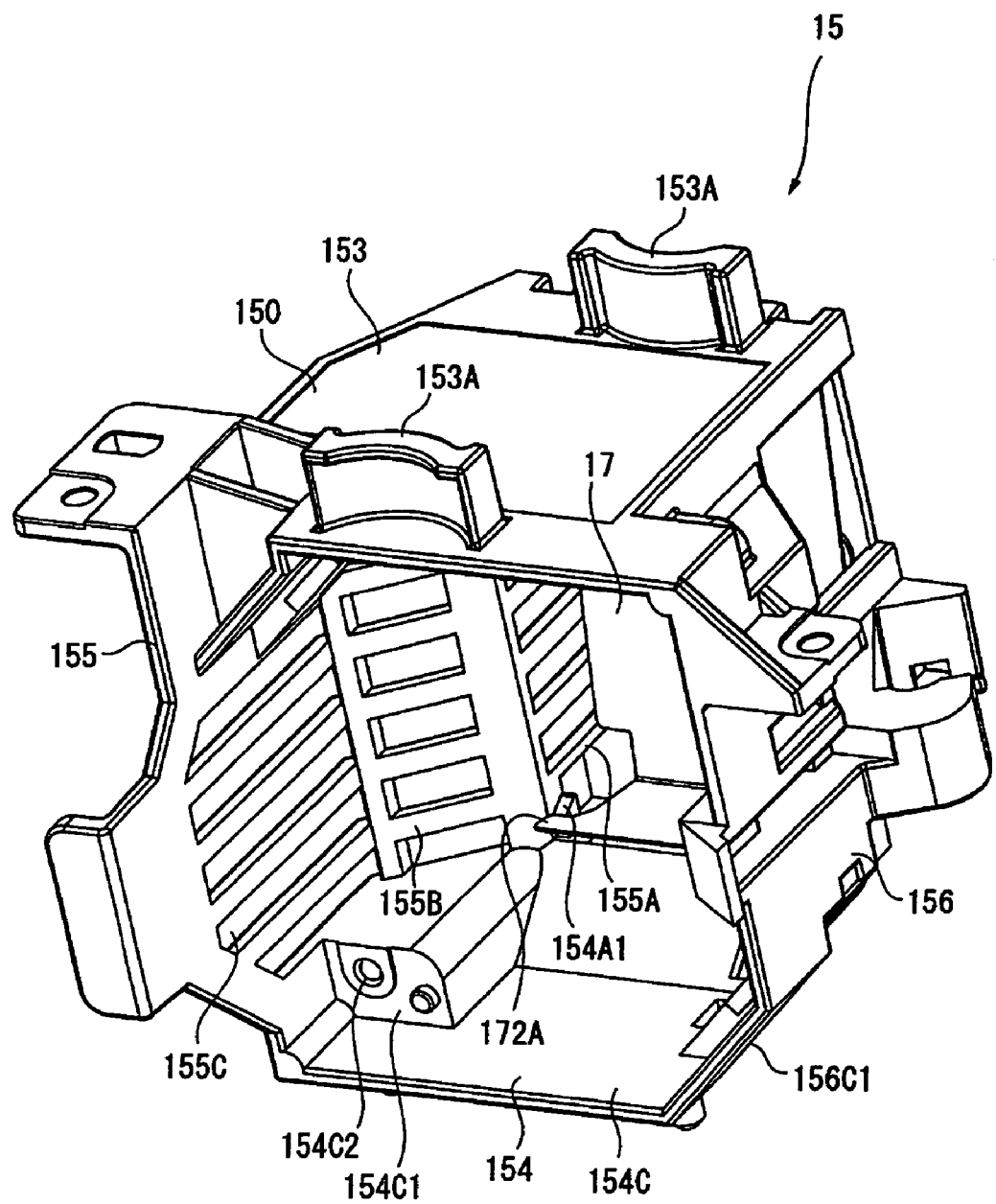
FIG. 13 is a perspective schematic showing the condition where the light-shielding plate is inserted into the housing body in an exemplary embodiment.

To begin with, the nail portions 171A in the first plane portion 171 of the light-shielding plate 17 are inserted into the holes 153D formed in the first side-face portion 153 of the housing body 15. Then, as shown in FIG. 12, the light-shielding plate 17 is forced into the inside of the housing body 15 so that the first plane portion 171 abuts against the opposing plane portion 152 of the housing body 15. And, as shown in FIG. 13, the engaging pieces 172A in the second plane portion 172 of the light-shielding plate 17 are engaged with the protrusions 154A1 formed in the second side-face portion 154 of the housing body 15. Thus, the light-shielding plate 17 is attached to the housing body 15.

By inserting the light-shielding plate 17 between the opposing plane portion 152 of the housing body 15 and the reflector 12 like this, the leakage of unwanted light from the housing 13 can be prevented or discouraged.

Also, by inserting the light-shielding plate 17 between the opposing plane portion 152 of the housing body 15 and the reflector 12, the housing body 15 can be prevented or discouraged from deterioration by heat from the light source lamp 11.

Further, the nail portions 171A of the light-shielding plate 17 are inserted into the holes 153D formed in the periphery of the opposing plane portion 152 of the housing body 15 to allow the light-shielding plate 17 to be reliably secured to the housing body 15.

Also, the engaging pieces are formed in an end portion of the light-shielding plate 17 to be engaged with the protrusions 154A1 formed in an end portion of on the second side-face portion 154 of the housing body 15. As such, the light-shielding plate 17 can be secured to the housing body 15.

Next, the light source lamp 11, the reflector 12 and the cover member 14 are inserted into the housing body 15 with the light-shielding plate 17 attached thereto. Thus, the housing body 15 covers the reflector 12 from its rear side. Subsequently, the bores 144C in the flange portion 144 of the cover member 14 are aligned with the threaded hole 153C1 in the fixing portion 153C of the housing body 15 and the threaded hole 154C2 in the fixing portion 154C1 to secure the cover member 14 and the housing body 15 with screws. Thus, the cover member 14 is combined with the housing body 15, whereby the housing 13 is finished.

At this time the side-face portion 150 of the housing body 15 covers the second body portion 143 of the cover member 14. Then, of the two fixing members 18 that secure the reflector 12 and the cover member 14, the interconnecting portion 183 of one of the fixing members 18 is disposed between the slanted face portion 155C1 of the housing body 15 and the cover member 14 and pinched and held between them. Also, the interconnecting portion 183 of the other of the fixing members 18 that secure the reflector 12 and the cover member 14 is pinched and held between the slanted face portion 156C1 of the housing body 15 and the cover member 14 (see FIG. 3).

The fixing members 18 for securing the reflector 12 and the cover member 14 are disposed between the slanted face portions 155C1, 156C1 of the housing body 15 and the cover member 14 and pinched and held between them when the housing body 15 is combined with the cover member 14. As such, the fixing members 18 can be prevented or discouraged from falling away even when a strong impact is applied to the light source device 10. This makes it possible to prevent or discourage the displacement of the reflector 12 with respect to the cover member 14.

Also, in this exemplary embodiment, in which clip-like urging members are adopted as the fixing members 18 for securing the reflector 12 and the cover member 14, just pinching the flange portion 122B of the reflector 12 and the peripheries of the holes 143E1, 143G1 in the cover member 14 by the urging portions 181, 182 allows them to be secured. Therefore the reflector 12 can be attached to the cover member 14 easily.

Further, the clip-like urging members of the fixing members 18 pinch and secure the flange portion 122B of the reflector 12 and the peripheries of the holes 143E1, 143G1 in the cover member 14. As such, even when the attachment position of the reflector 12 is adjusted again after having secured the reflector 12 to the cover member 14, just grasping the fixing members 18 to apply a force in a direction such that the urging force of the urging portions 181, 182 of the fixing members 18 is released allows the fixing members 18 to be disengaged easily, and therefore the attachment position of the reflector 12 can be adjusted easily.

In addition, combining the cover member 14 with the housing body 15 causes the lid portion 156C2 of the housing body 15 to cover the concave gutter portion 143D1 of the cover member 14, whereby the hollow pipe-like duct 19 is finished. The duct 19 is in communication with a space inside the housing 13. Therefore, in such housing 13, cooled air is introduced through the slits 144A formed in the cover member 14 to cool the inside of the housing 13 and then the air is exhausted through the duct 19.

Since in this exemplary embodiment the slits 144A are formed in the cover member 14, cooled air can be introduced into the housing 13. Especially, since three slits 144A are formed in this exemplary embodiment, a sufficient volume of air to be introduced can be ensured and therefore the housing space inside the housing 13 can be cooled efficiently.

Further, the housing body 15 has the lid portion 156C2 for covering the gutter portion 143D1 of the cover member 14 formed in a place corresponding to the place where the gutter portion 143D1 of the cover member 14 is located. As such, when the cover member 14 is combined with the housing body 15, the duct 19 for communicating with the housing space to accommodate the reflector 12 and the light source lamp 11 is formed. Thus, the following are made possible: to exhaust the air in the housing space, which has been heated by heat that the light source lamp 11 generates through the duct 19; and to cool the light source lamp 11 efficiently.

The exemplary embodiments are not limited to the forementioned, and may include modifications and improvements made within the scope and spirit of the exemplary embodiments which allows the above described benefits and other benefits to be achieved.

For example, while in this exemplary embodiment the nail portions 171A are formed in a leading end of the first plane portion 171 of the light-shielding plate 17, which are inserted into the holes 153D formed in the first side-face portion 153 of the housing body 15, the nail portions 171A may not be required. In addition, while the engaging pieces 172A to be engaged with the protrusions 154A1 formed on the second side-face portion 154 of the housing body 15 are formed in a leading end of the second plane portion 172 of the light-shielding plate 17, the light-shielding plate doesn't have to have the engaging pieces 172A. This allows the light-shielding plate to be simplified in shape.

Also, while the light-shielding plate 17 has the substantial L form in side view and is disposed along the opposing plane portion 152 and second side-face portion 154 of the housing body 15, the exemplary embodiments are not so limited. For example, the light-shielding plate 17 may be shaped into a substantial horseshoe form in side view and disposed along the first side-face portion 153 of the housing body 15. By arranging the light-shielding plate 17 like this, the first side-face portion 153 of the housing body 15 can be prevented from being affected by heat from the light source lamp 11.

Still further, the light-shielding plate may be arranged to have a substantially rectangular flat form in plane view and disposed along only the opposing plane portion 152.

In addition, the light-shielding plate 17 is not required. If doing so, the number of members can be reduced.

Also, while in this exemplary embodiment the light-shielding plates 16 are inserted between the cover member 14 and the reflector 12, the light-shielding plates 16 do not have to be provided. If doing so, the number of the members can be reduced.

Further, while in this exemplary embodiment the concave gutter portion 143D1 is formed in the cover member 14 and the lid portion 156C2 for covering the gutter portion 143D1 is formed in the housing body 15, the exemplary embodiments are not so limited. The following arrangement is possible: a lid portion may be formed in the cover unit and a concave gutter portion may be formed in the housing body. Alternatively, concave gutter portions may be formed in the cover unit and the housing body, and placed opposite to each other, thereby to form a pipe-like duct.

Also, while in this exemplary embodiment the duct 19 is formed when the cover member 14 and the housing body 15 are combined into the housing 13, such duct 19 does not have to be formed. For example, the exemplary embodiments may be of a structure such that cooled air is introduced through a slit 144A formed in the cover member and exhausted through other slits 144A after having cooled the interior of the housing.

This arrangement allows the interior of the housing to be cooled and doesn't require the formation of a duct. As such, the cover member and the housing body can be simplified in their structure.

Also, while clip-like urging members are used as the fixing members 18 for securing the cover member 14 and the reflector 12, the exemplary embodiments are not so limited.

Further, while only an example of the projector 1 with three liquid crystal panels 441 has been described, the exemplary embodiments are not so limited. The exemplary embodiments may be applied to a projector with two liquid crystal panels and a projector with four or more liquid crystal panels.

In addition, while only an example of the front-type projector 1 which projects light from a direction of watching a screen has been described, the exemplary embodiments are also applicable to a rear-type projector which projects light from the opposite side to the direction of watching a screen.

INDUSTRIAL APPLICABILITY

The invention can be utilized for optical equipment such as projectors.

What is claimed is:

1. A light source device, comprising:
a light source lamp providing a light beam;
a reflector having a reflecting portion to align and launch the light beam; and
a housing to accommodate the reflector and the light source lamp, the housing comprising:
a cover member comprising:
an opening for a light beam transmission formed therein;
air intake slits; and
a concave gutter portion of a hollow exhaust duct, wherein the cover member covers the reflecting portion of the reflector from a front side of the reflector in a light beam launching, direction; and
a housing body comprising:
an opening to accommodate the light source lamp, the reflector, and the cover member; and
a lid portion of the hollow exhaust duct,
wherein the housing body covers the reflector from a rear side of the reflector in the light beam launching direction,
wherein, when the cover member is attached to the housing body, the hollow exhaust duct is formed in fluid communiction with a space inside the housing and with a space outside the housing; and
fixing members, comprising:
a pair of urging portions each comprising at least one bent notch; and
an interconnecting portion to connect the urging portions,
wherein the fixing members secure the reflector to the cover member.

2. The light source device of claim 1, the reflecting portion of the reflector further comprising:
a reflecting portion main body to align and launch the light beam from the light source lamp, and
a flange portion extending outwardly from a periphery of an opening to launch the light beam of the reflecting portion main body, and
the urging portions of the fixing members to at least one of urge, pinch, and hold the flange portion of the reflector and an abutting face of the cover member abutting against the flange portion.

3. The light source device of claim 1, further comprising:
light-shielding plates inserted between an outer surface of the reflecting portion of the reflector and the cover member.

4. The light source device of claim 1, the housing body having
an opposing plane portion opposed to the opening to accommodate the cover member, the reflector, and the light source lamp, and
side-face portions extending from an outer periphery of the opposing plane portion toward the opening, and
the light source device further comprising:
a light-shielding plate inserted between the opposing plane portion and the reflector.

5. The light source device of claim 4, the opposing plane portion having holes formed in the outer periphery, and
nail portions formed in the light-shielding plate being inserted in the holes.

6. The light source device of claim 5, the light-shielding plate being shaped into a substantially L form in a side view, and
the light-shielding plate having:
the nail portions formed in one end portion in a direction along the L form of the light-shielding plate, and
engaging pieces formed in another end portion to engage with protrusions formed on the side-face portion of the housing body.

7. A projector, comprising:
the light source device of claim 1;
a light modulation device to modulate the light beam launched from the light source device according to image data; and
a projection optical device to enlarge and project the light beam modulated by the light modulation device.

8. The projector according to claim 7, the reflecting portion of the reflector further comprising:
a reflecting portion main body to align and launch the light beam from the light source lamp, and
a flange portion extending outwardly from a periphery of an opening to launch the light beam of the reflecting portion main body; and
the urging portions of the fixing members to at least one of urge, pinch, and hold the flange portion of the reflector and an abutting face of the cover member abutting against the flange portion.

9. The projector according to claim 7,
wherein, when the cover member is attached to the housing body, a hollow exhaust duct is formed that is in fluid communication with a space inside the housing and with a space outside the housing.

10. The projector according to claim 7, further comprising light-shielding plates inserted between an outer surface of the reflecting portion of the reflector and the cover member.

11. The projector according to claim 7, the housing body further comprising:
an opposing plane portion opposed to the opening to accommodate the cover member, the reflector, and the light source lamp, and
side-face portions extending from an outer periphery of the opposing plane portion toward the opening, and
the light source device further comprising:
a light-shielding plate inserted between the opposing plane portion and the reflector.

12. The projector according to claim 11, the opposing plane portion having holes formed in the outer periphery, and
nail portions formed in the light-shielding plate being inserted in the holes.

13. The projector according to claim 12, the light-shielding plate being shaped into a substantially L form in a side view, and
the light-shielding plate having:
the nail portions formed in one end portion in a direction along the L form of the light-shielding plate, and
engaging pieces formed in another end portion to engage with protrusions formed on the side-face portion of the housing body.

* * * * *